(12) United States Patent
Tsunozaki

(10) Patent No.: US 10,062,905 B2
(45) Date of Patent: Aug. 28, 2018

(54) PROCESS FOR PRODUCING CATHODE ACTIVE MATERIAL FOR LITHIUM ION SECONDARY BATTERY

(71) Applicant: Sumitomo Chemical Co., Ltd., Tokyo (JP)

(72) Inventor: Kentaro Tsunozaki, Chiyoda-ku (JP)

(73) Assignee: SUMITOMO CHEMICAL CO., LTD., Tokyo (JP)

( * ) Notice: Subject to any disclaimer, the term of this patent is extended or adjusted under 35 U.S.C. 154(b) by 388 days.

(21) Appl. No.: 14/971,083

(22) Filed: Dec. 16, 2015

(65) Prior Publication Data

US 2016/0104886 A1 Apr. 14, 2016

Related U.S. Application Data

(63) Continuation of application No. PCT/JP2014/067020, filed on Jun. 26, 2014.

(30) Foreign Application Priority Data

Jul. 5, 2013 (JP) ................................ 2013-142029

(51) Int. Cl.
| | |
|---|---|
| H01M 4/485 | (2010.01) |
| H01M 4/505 | (2010.01) |
| H01M 4/525 | (2010.01) |
| H01M 10/0525 | (2010.01) |
| C01G 51/00 | (2006.01) |
| C01G 53/00 | (2006.01) |
| H01M 4/02 | (2006.01) |

(52) U.S. Cl.
CPC ............ *H01M 4/485* (2013.01); *C01G 51/50* (2013.01); *C01G 53/50* (2013.01); *H01M 4/505* (2013.01); *H01M 4/525* (2013.01); *H01M 10/0525* (2013.01); *C01P 2004/80* (2013.01); *H01M 2004/028* (2013.01)

(58) Field of Classification Search
CPC ...... H01M 4/485; H01M 4/505; H01M 4/525; H01M 10/0525
See application file for complete search history.

(56) References Cited

U.S. PATENT DOCUMENTS

| | | | |
|---|---|---|---|
| 7,314,682 B2 | 1/2008 | Thackeray et al. | |
| 2009/0011335 A1 | 1/2009 | Takeda et al. | |
| 2010/0136412 A1 | 6/2010 | Watanabe | |
| 2014/0113193 A1 | 4/2014 | Tsunozaki et al. | |

FOREIGN PATENT DOCUMENTS

| | | |
|---|---|---|
| CN | 101047241 A | 10/2007 |
| CN | 102208607 A | 10/2011 |
| CN | 103181006 A | 6/2013 |
| JP | 9-55203 | 2/1997 |
| JP | 9-231963 | 9/1997 |
| JP | 10-40900 | 2/1998 |
| JP | 2000-40505 | 2/2000 |
| JP | 2003-123755 | 4/2003 |
| JP | 2004-164988 | 6/2004 |
| JP | 2005-135849 | 5/2005 |
| JP | 2008-184346 | 8/2008 |
| JP | 2009-4285 | 1/2009 |
| JP | 2009-200013 | 9/2009 |
| JP | 2010-126422 | 6/2010 |
| WO | WO 2012/176904 A1 | 12/2012 |

OTHER PUBLICATIONS

U.S. Appl. No. 13/872,676, filed Apr. 29, 2013, 2013/0236788 A1, Kentaro Tsunozaki et al.
U.S. Appl. No. 13/963,057, filed Aug. 9, 2013, 2013/0318780 A1, Kentaro Tsunozaki et al.
U.S. Appl. No. 14/140,059, filed Dec. 24, 2013, 2014/0110641 A1, Eisuke Murotani et al.
U.S. Appl. No. 14/139,969, filed Dec. 24, 2013, 2014/0113194 A1, Kentaro Tsunozaki et al.
U.S. Appl. No. 14/173,032, filed Feb. 5, 2014, 2014/0154581 A1, Takeshi Kawasato et al.
U.S. Appl. No. 14/230,950, filed Mar. 31, 2014, 2014/0212758 A1, Takeshi Kawasato et al.
English Translation of International Search Report dated Sep. 9, 2014 in PCT/JP2014/067020, filed Jun. 26, 2014.

*Primary Examiner* — Oi K Conley
(74) *Attorney, Agent, or Firm* — Oblon, McClelland, Maier & Neustadt, L.L.P.

(57) ABSTRACT

To provide a process for producing a cathode active material for a lithium ion secondary battery which can improve the initial charge and discharge efficiency (initial efficiency) and the cycle retention of a lithium ion secondary battery.
A process for producing a cathode active material for a lithium ion secondary battery, which comprises a step (I) of bringing a lithium-containing composite oxide (I) containing Li element and a transition metal element into contact with a washing liquid and then separating it from the washing liquid to obtain a lithium-containing composite oxide (II), a step (II) of bringing the lithium-containing composite oxide (II) into contact with a composition (1) consisting of an aqueous solution containing an anion (A) preferably containing F and a composition (2) consisting of an aqueous solution containing a cation (M) preferably containing Al or Zr, and a step (III) of heating the lithium-containing composite oxide (II) after the step (II), in this order.

15 Claims, No Drawings

US 10,062,905 B2

PROCESS FOR PRODUCING CATHODE ACTIVE MATERIAL FOR LITHIUM ION SECONDARY BATTERY

TECHNICAL FIELD

The present invention relates to a process for producing a cathode active material for a lithium ion secondary battery, and a process for producing a positive electrode for a lithium ion secondary battery and a process for producing a lithium ion secondary battery, employing the above production process.

BACKGROUND ART

A lithium ion secondary battery has been widely used for portable electronic device such as mobile phones and notebook personal computers. For a cathode active material for a lithium ion secondary battery, a composite oxide of lithium and a transition metal or the like (hereinafter sometimes referred to as lithium-containing composite oxide) such as $LiCoO_2$, $LiNiO_2$, $LiNi_{0.8}Co_{0.2}O_2$ or $LiMn_2O_4$ has been used.

Further, in recent years, for a lithium ion secondary battery for portable electronic device or for vehicles, downsizing and weight saving are required, and further improvement in the charge and discharge efficiency has been desired.

Patent Document 1 discloses a process of bringing an aqueous solution containing a specific cation M, an aqueous solution containing an anion N which reacts with the cation M to form a hardly soluble salt, and a lithium-containing composite oxide containing Li element and a transition metal element into contact with one another, followed by heating to provide a covering layer on the lithium-containing composite oxide, whereby the retention of the discharge capacity after a discharge cycle is repeated (cycle retention) is improved.

Further, Patent Document 2 discloses that the initial charge and discharge efficiency (initial efficiency) is improved by treating a powder of a lithium-containing composite oxide containing Li element and a transition metal element with nitric acid, treating it with an ammonia gas and then subjecting it to a heat treatment.

PRIOR ART DOCUMENTS

Patent Documents

Patent Document 1: WO2012/176904
Patent Document 2: U.S. Pat. No. 7,314,682

DISCLOSURE OF INVENTION

Technical Problem

However, by conventional technique, the charge and discharge efficiency of a lithium ion secondary battery is not necessarily sufficient, and an improvement is desired.

Specifically, a lithium ion secondary battery having a high initial efficiency and having a high cycle retention is desired.

Under these circumstances, the object of the present invention is to provide a process for producing a cathode active material for a lithium ion secondary battery which can improve both initial efficiency and cycle retention of an obtainable lithium ion secondary battery, and a process for producing a positive electrode for a lithium ion secondary battery and a process for producing a lithium ion secondary battery, employing the above production process.

Solution to Problem

The present invention provides the following [1] to [15].

[1] A process for producing a cathode active material for a lithium ion secondary battery, comprising the following steps (I), (II) and (III) in this order:

step (I): a step of bringing a lithium-containing composite oxide (I) containing Li element and a transition metal element into contact with a washing liquid and then separating it from the washing liquid to obtain a lithium-containing composite oxide (II), step (II): a step of bringing the lithium-containing composite oxide (II) into contact with the following composition (1) and composition (2) to obtain a lithium-containing composite oxide (III), and step (III): a step of heating the lithium-containing composite oxide (III), composition (1): an aqueous solution containing a monoatomic or polyatomic anion (A) containing at least one element (a) selected from the group consisting of S, P, F and B, composition (2): an aqueous solution containing a monoatomic or complex cation (M) of at least one metal element (m) selected from the group consisting of Li, Mg, Ca, Sr, Ba, Y, Ti, Zr, Hf, V, Nb, Ta, Cr, Mo, W, Mn, Fe, Co, Ni, Cu, Zn, Al, Ga, In, Sn, Sb, Bi, La, Ce, Pr, Nd, Gd, Dy, Er and Yb.

[2] The process for producing a cathode active material for a lithium ion secondary battery according to the above [1], wherein the metal element (m) contained in the composition (2) is Al.

[3] The process for producing a cathode active material for a lithium ion secondary battery according to the above [1] or [2], wherein in the step (II), the lithium-containing composite oxide (II) is brought into contact with the compositions (1) and (2) so that the sum of the products of the absolute value of the valence of each cation (M) and the molar ratio of the cation (M) contained in the composition (2) based on the total amount of the transition metal element contained in the lithium-containing composite oxide (I), is within a range of from 0.001 to 0.15.

[4] The process for producing a cathode active material for a lithium ion secondary battery according to any one of the above [1] to [3], wherein the anion (A) contained in the composition (1) is $F^-$.

[5] The process for producing a cathode active material for a lithium ion secondary battery according to any one of the above [1] to [4], wherein in the step (II), the lithium-containing composite oxide (II) is brought into contact with the compositions (1) and (2) so that the sum of the products of the absolute value of the valence of each anion (A) and the molar ratio of the anion (A) contained in the composition (1) based on the total amount of the transition metal element contained in the lithium-containing composite oxide (I), is within a range of from 0.001 to 0.15.

[6] The process for producing a cathode active material for a lithium ion secondary battery according to any one of the above [1] to [5], wherein in the step (I), the washing liquid is an aqueous acidic solution having a pH of from 0 to 6 at 25° C.

[7] The process for producing a cathode active material for a lithium ion secondary battery according to any one of the above [1] to [6], wherein the lithium elution ratio is from 0.2 to 10% as represented by the proportion of the amount of lithium element dissolved in the washing liquid based on the entire lithium element contained in the lithium-containing composite oxide (I).

[8] The process for producing a cathode active material for a lithium ion secondary battery according to any one of the above [1] to [7], wherein the lithium-containing composite oxide (I) contains Li element and at least one transition metal element selected from the group consisting of Ni, Co and Mn, and the molar amount of the Li element is more than 1.2 times the total molar amount of the transition metal element.

[9] The process for producing a cathode active material for a lithium ion secondary battery according to the above [8], wherein the lithium-containing composite oxide (I) is a compound represented by the following formula (1):

$$Li(Li_{x1}Mn_{y1}Me_{z1})Me'_aO_pF_q \quad (1)$$

wherein Me is at least one element selected from the group consisting of Co and Ni, Me' is at least one member selected from the group consisting of Al, Cr, Mg, Mo, Ru, Ti, Zr and Fe, $0.1 < x^1 < 0.25$, $0.5 \leq y^1/(y^1+z^1) \leq 0.8$, $0 \leq a \leq 0.1$, $x^1+y^1+z^1=1$, $1.9 < p < 2.1$ and $0 \leq q \leq 0.1$.

[10] The process for producing a cathode active material for a lithium ion secondary battery according to any one of the above [1] to [9], wherein the heating in the step (III) is carried out at from 250 to 700° C.

[11] The process for producing a cathode active material for a lithium ion secondary battery according to any one of the above [1] to [10], wherein the solvent of each of the compositions (1) and (2) in the step (II) is only water.

[12] The process for producing a cathode active material for a lithium ion secondary battery according to any one of the above [1] to [11], wherein in the step (II), the lithium-containing composite oxide (II) is brought into contact with the composition (1) and the composition (2) by spraying the composition (1) and the composition (2) to the lithium-containing composite oxide (II) by a spray coating method.

[13] The process for producing a cathode active material for a lithium ion secondary battery according to the above [12], wherein in the step (II), the lithium-containing composite oxide (II) is brought into contact with the composition (1) and the composition (2) by spraying the composition (1) and the composition (2) to the lithium-containing composite oxide (II) with stirring.

[14] A process for producing a positive electrode for a lithium ion secondary battery, which comprises a step of producing a cathode active material for a lithium ion secondary battery by the production process as defined in any one of the above [1] to [13], and a step of forming a cathode active material layer containing the cathode active material for a lithium ion secondary battery, a binder and an electrically conductive material on a cathode current collector.

[15] A process for producing a lithium ion secondary battery, which comprises a step of producing a positive electrode for a lithium ion secondary battery by the production process as defined in the above [14], and a step of assembling a lithium ion secondary battery by using the positive electrode for a lithium ion secondary battery, a negative electrode, a non-aqueous electrolyte and a separator.

Advantageous Effects of Invention

According to the present invention, it is possible to obtain a cathode active material for a lithium ion secondary battery which can improve both initial efficiency and cycle retention of an obtainable lithium ion secondary battery, and a positive electrode for a lithium ion secondary battery, can be obtained.

According to the present invention, a lithium ion secondary battery having excellent initial efficiency and cycle retention can be obtained.

DESCRIPTION OF EMBODIMENTS

Now, the embodiments of the present invention will be described. In this specification, an element symbol (for example, "Li") means an element, not a single substance (for example, a metal) of the element, unless otherwise specified.

<Process for Producing Cathode Active Material for Lithium Ion Secondary Battery>

The process for producing a cathode active material for a lithium ion secondary battery of the present invention (hereinafter referred to as the present production process) comprises the following steps (I), (II) and (III) in this order. A synergistic effect by the combination is obtained as compared with a case where the respective steps are carried out individually, and the initial efficiency and the cycle retention can be further improved. The present production process may contain another step between the respective steps so long as the following steps are carried out in this order. From the viewpoint of the production efficiency, the following steps are preferably carried out continuously.

Step (I): A step of bringing a lithium-containing composite oxide (I) containing Li element and a transition metal element into contact with a washing liquid, and then separating it from the washing liquid to obtain a lithium-containing composite oxide (II).

Step (II): A step of bringing the lithium-containing composite oxide (II) into contact with a composition (1) and a composition (2) to obtain a lithium-containing composite oxide (III).

Step (III): A step of heating the lithium-containing composite oxide (III).

The composition (1) and the composition (2) are respectively the following aqueous solutions. Hereinafter in this specification, the composition (1) and the composition (2) together may sometimes be referred to as a coating liquid.

Composition (1): An aqueous solution containing a monoatomic or complex anion (A) containing at least one element (a) selected from the group consisting of S, P, F and B.

Composition (2): An aqueous solution containing a monoatomic or complex cation (M) of at least one metal element (m) selected from the group consisting of Li, Mg, Ca, Sr, Ba, Y, Ti, Zr, Hf, V, Nb, Ta, Cr, Mo, W, Mn, Fe, Co, Ni, Cu, Zn, Al, Ga, In, Sn, Sb, Bi, La, Ce, Pr, Nd, Gd, Dy, Er and Yb.

[Lithium-Containing Composite Oxide]

The lithium-containing composite oxide (I) to be used in the present production process contains Li and a transition metal element. In the step (I) of the present production process, the lithium-containing composite oxide before brought into contact with the washing liquid will be referred to as a lithium-containing composite oxide (I).

The transition metal element contains at least one member selected from the group consisting of Ni, Co, Mn, Fe, Cr, V and Cu.

As the lithium-containing composite oxide, a known lithium-containing composite oxide as an active material for a lithium ion secondary battery may be used. The lithium-containing composite oxide may be used alone or in combination of two or more.

The lithium-containing composite oxide (I) is preferably, for example, the following compound (i), (ii), (iii) or (iv).

Compound (i): A compound containing Li and at least one transition metal element selected from the group consisting of Ni, Co and Mn, in a molar amount of Li of more than 1.2 times the total molar amount of the transition metal element. The compound (i) is preferably a compound represented by the following formula (1).

Compound (ii): A compound represented by the following formula (2).

Compound (iii): A compound of olivine metal lithium salt, which is a compound represented by the following formula (3) or a composite thereof.

Compound (iv): A compound represented by the following formula (4).

Among them, more preferred is the compound (i) in that a high capacity of a lithium ion secondary battery is obtained.

[Compound (i)]

$$Li(Li_{x1}Mn_{y1}Me_{z1})Me'_aO_pF_q \qquad (1)$$

In the formula (1), Me is at least one element selected from the group consisting of Co and Ni, and Me' is at least one member selected from the group consisting of Al, Cr, Mg, Mo, Ru, Ti, Zr and Fe. $0.1 < x^1 < 0.25$, $0.5 \le y^1/(y^1+z^1) \le 0.8$, $0 \le a \le 0.1$, $x^1+y^1+z^1=1$, $1.9 < p < 2.1$ and $0 \le q \le 0.1$.

The compound (i) is particularly preferably
$Li(Li_{0.16}Ni_{0.17}Co_{0.08}Mn_{0.59})O_2$,
$Li(Li_{0.17}Ni_{0.17}Co_{0.17}Mn_{0.49})O_2$,
$Li(Li_{0.17}Ni_{0.21}Co_{0.08}Mn_{0.54})O_2$,
$Li(Li_{0.17}Ni_{0.14}Co_{0.14}Mn_{0.55})O_2$,
$Li(Li_{0.18}Ni_{0.12}CO_{0.12}Mn_{0.58})O_2$,
$Li(Li_{0.18}Ni_{0.16}Co_{0.12}Mn_{0.54})O_2$,
$Li(Li_{0.20}Ni_{0.12}CO_{0.08}Mn_{0.60})O_2$,
$Li(Li_{0.20}Ni_{0.16}Co_{0.08}Mn_{0.56})O_2$, or
$Li(Li_{0.20}Ni_{0.13}Co_{0.13}Mn_{0.54})O_2$.

The compound represented by the formula (1) preferably has a layered rock salt crystal structure (space group R-3m). Further, since the proportion of the Li element is high based on the transition metal element, in XRD (X-ray source: CuKα) measurement, a peak is observed within a range of 2θ=20 to 25° like layered $Li_2MnO_3$.

[Compound (ii)]

$$Li_a(Ni_{x2}Mn_{y2}Co_{z2})Me''_bO_2 \qquad (2)$$

In the formula (2), $0.95 \le a \le 1.1$, $0 \le x^2 \le 1$, $0 \le y^2 \le 1$, $0 \le z^2 \le 1$, $0 \le b \le 0.3$ and $0.90 \le x^2+y^2+z^2+b \le 1.05$, and Me'' is at least one member selected from the group consisting of Mg, Ca, Sr, Ba, Al, Ti, Zr, Fe, Sn and Cr.

The compound (ii) represented by the formula (2) may, for example, be $LiCoO_2$, $LiNiO_2$, $LiMnO_2$, $LiMn_{0.5}Ni_{0.5}O_2$, $LiNi_{0.5}Co_{0.2}Mn_{0.3}O_2$, $LiNi_{0.85}Co_{0.10}Al_{0.05}O_2$ or $LiNi_{1/3}Co_{1/3}Mn_{1/3}O_2$.

[Compound (iii)]

The olivine metal lithium salt (compound (iii)) is a compound represented by the following formula (3) or a composite thereof.

$$Li_LX_{x3}Y_{y3}O_{z3}F_g \qquad (3)$$

In the formula (3), X is Fe(II), Co(II), Mn(II), Ni(II), V(II) or Cu(II), Y is P or Si, $0 \le L \le 3$, $1 \le x^3 \le 2$, $1 \le y^3 \le 3$, $4 \le z^3 \le 12$ and $0 \le g \le 1$.

The compound (iii) may be $LiFePO_4$, $Li_3Fe_2(PO_4)_3$, $LiFeP_2O_7$, $LiMnPO_4$, $LiNiPO_4$, $LiCoPO_4$, $Li_2FePO_4F$, $Li_2MnPO_4F$, $Li_2NiPO_4F$, $Li_2CoPO_4F$, $Li_2FeSiO_4$, $Li_2MnSiO_4$, $Li_2NiSiO_4$ or $Li_2CoSiO_4$.

[Compound (iv)]

$$Li(Mn_{2-x4-y4}Me'''_{x4}Li_{y4})O_{4-h}F_h \qquad (4)$$

In the formula (4), $0 \le x^4 \le 2$, $0 \le y^4 \le 0.33$ and $0 \le h \le 0.1$, and Me''' is at least one member selected from the group consisting of Co, Ni, Fe, Ti, Cr, Mg, Ba, Nb, Ag, Cu, Sn, Zn, Ga and Al.

The compound (iv) represented by the formula (iv) may be $LiMn_2O_4$, $LiMn_{1.5}Ni_{0.5}O_4$, $LiMn_{1.0}Co_{1.0}O_4$, $LiMn_{1.85}Al_{0.15}O_4$ or $LiMn_{1.9}Mgo_{0.1}O_4$.

The lithium-containing composite oxide (I) is preferably in the form of particles. Further, the average particle size (D50) is preferably from 0.03 to 30 μm. In a case where the lithium-containing composite oxide (I) is the compound (i), the compound (ii) or the compound (iv), D50 is preferably from 3 to 30 μm, more preferably from 4 to 25 μm, particularly preferably from 5 to 20 μm. In a case where the lithium-containing composite oxide (I) is the compound (iii), D50 is preferably from 0.03 to 5 μm, more preferably from 0.04 to 1 μm, particularly preferably from 0.05 to 0.5 μm.

In this specification, D50 means a volume based accumulative 50% size at a point of 50% on an accumulative curve drawn by obtaining the volume-based particle size distribution and taking the whole to be 100%. The particle size distribution is obtained from frequency distribution and an accumulative volume distribution curve measured by a laser scattering particle size distribution measuring apparatus. To measure the particle size, the particle size distribution is measured by sufficiently dispersing a powder in an aqueous medium e.g. by ultrasonic treatment (for example, by means of laser diffraction/scattering type particle size distribution measuring apparatus Partica LA-950VII manufactured by HORIBA Ltd.).

[Method for Producing Lithium-Containing Composite Oxide]

As a method for producing the lithium-containing composite oxide (I), a method of mixing a coprecipitate containing a transition metal obtained by a coprecipitation method with a lithium compound and firing the mixture, a hydrothermal synthesis method, a sol-gel method, a dry mixing method (solid phase method), an ion exchange method or a glass crystallization method may properly be employed.

Particularly preferred is a method of mixing the coprecipitate with a lithium compound and firing the mixture, whereby a high discharge capacity tends to be obtained. The coprecipitation method is preferably an alkali coprecipitation method or a carbonate coprecipitation method.

In a case where the lithium composite oxide (I) is the compound (i), the carbonate coprecipitation method is preferred, whereby a high discharge capacity tends to be obtained.

Such production methods may be carried out by known means.

[Alkali Coprecipitation Method]

The alkali coprecipitation method is a method of continuously mixing an aqueous metal salt solution containing a transition metal element and a pH adjusting liquid containing a strong alkali to precipitate a hydroxide containing the transition metal element in a reaction solution while the pH of the reaction solution is kept constant. By the alkali coprecipitation method, the powder density of the obtainable coprecipitate is high, and a cathode active material having an excellent packing density in a cathode active material layer will be obtained.

The metal salt containing the transition metal element may be a nitrate, acetate, chloride salt or sulfate of a transition metal element. Preferred is a sulfate of a transition metal element, more preferred is a sulfate of Ni, a sulfate of Co or a sulfate of Mn, whereby excellent battery characteristics will be obtained at a relatively low material cost.

The sulfate of Ni may, for example, be nickel(II) sulfate hexahydrate, nickel(II) sulfate heptahydrate or nickel(II) ammonium sulfate hexahydrate.

The sulfate of Co may, for example, be cobalt(II) sulfate heptahydrate or cobalt(II) ammonium sulfate hexahydrate.

The sulfate of Mn may, for example, be manganese(II) sulfate pentahydrate or manganese(II) ammonium sulfate hexahydrate.

The pH of the solution during the reaction in the alkali coprecipitation method is preferably from 10 to 12.

The pH adjusting liquid containing a strong alkali to be added is preferably an aqueous solution containing at least one member selected from the group consisting of sodium hydroxide, potassium hydroxide and lithium hydroxide. Among them, an aqueous sodium hydroxide solution is particularly preferred.

To the reaction solution in the alkali coprecipitation method, an aqueous ammonia solution or an aqueous ammonium sulfate solution may be added to adjust the solubility of the transition metal element.

[Carbonate Coprecipitation Method]

The carbonate coprecipitation method is a method of continuously mixing an aqueous metal salt solution containing a transition metal element with an aqueous alkali metal carbonate solution to precipitate a carbonate containing the transition metal element in the reaction solution. By the carbonate coprecipitation method, the coprecipitate to be obtained is porous and has a large specific surface area, and a cathode active material exhibiting a high discharge capacity will be obtained.

The metal salt containing the transition metal element to be used in the carbonate coprecipitation method may be the same transition metal salt as mentioned for the alkali coprecipitation method.

The pH of the solution during the reaction in the carbonate coprecipitation method is preferably from 7 to 9.

The aqueous alkali metal carbonate solution is preferably an aqueous solution containing at least one member selected from the group consisting of sodium carbonate, sodium hydrogen carbonate, potassium carbonate and potassium hydrogen carbonate.

To the reaction solution in the carbonate coprecipitation method, an aqueous ammonia solution or an aqueous ammonium sulfate solution may be added from the same reason as the alkali coprecipitation method.

The reaction solution containing a coprecipitate precipitated by the alkali coprecipitation method or the carbonate coprecipitation method is preferably subjected to a step of removing the aqueous solution by filtration, sedimentation or centrifugal separation. For filtration or centrifugal separation, a pressure filter, a vacuum filter, a centrifugal classifier, a filter press, a screw press or a rotary dehydrator may, for example, be used.

The obtained coprecipitate is preferably subjected to a washing step to remove impurity ions such as sodium. As a method of washing the coprecipitate, for example, a method of repeating filtration and dispersion in deionized water may be mentioned.

The lithium-containing composite oxide is obtained by mixing the coprecipitate obtained by the coprecipitation method with a lithium compound and firing the mixture. The lithium compound is, for example, preferably lithium carbonate, lithium hydroxide or lithium nitrate, more preferably lithium carbonate which is available at a low cost.

The firing temperature is preferably from 500 to 1,000° C. When the firing temperature is within the above range, a lithium-containing composite oxide having high crystallinity tends to be obtained. The firing temperature is more preferably from 600 to 1,000° C., particularly preferably from 800 to 950° C.

The firing time is preferably from 4 to 40 hours, more preferably from 4 to 20 hours.

The firing is preferably carried out in an oxygen-containing atmosphere, for example, while the air is supplied.

By firing in an oxygen-containing atmosphere, the transition metal element in the coprecipitate is sufficiently oxidized, and high crystallinity tends to be obtained.

[Step (I)]

In the present production process, first, the lithium-containing composite oxide (I) is brought into contact with the washing liquid and then separated with the washing liquid to obtain a lithium-containing composite oxide (II).

The lithium-containing composite oxide (I) contains as an impurity Li which does not form a crystal structure of the lithium-containing composite oxide. Further, it may contain an alkali component such as Li, Na or K derived from materials (coprecipitate, lithium compound and others) for production of the lithium-containing composite oxide (I). Such alkali components will be hereinafter referred to as free alkali. The free alkali is considered to be attached to the surface of the lithium-containing composite oxide in the form of a hydroxide or a carbonate.

By the washing treatment, the free alkali can be removed from the lithium-containing composite oxide. As a result, by using the lithium-containing composite oxide subjected to the washing treatment as a cathode active material, the battery characteristics of a lithium ion secondary battery can be improved.

The washing liquid may be one in which the free alkali can be dissolved, and is preferably water or an aqueous acidic solution. In a case where water is used, the washing liquid may contain a pH adjusting agent or the like so as to control the solubility of the free alkali and to improve the handling efficiency.

The washing liquid is preferably an aqueous acidic solution, whereby the free alkali is easily dissolved, and a high charge and discharge efficiency and a high discharge capacity will be obtained. Particularly preferred is an aqueous acidic solution having a pH of from 0 to 6 at 25° C. The pH of the washing liquid is more preferably from 0.5 to 5, further preferably from 1 to 4.

In a case where the washing liquid is an aqueous acidic solution, the acid component contained in the washing liquid is preferably an acid component containing no F, whereby the washing liquid and the lithium-containing composite oxide (II) are easily separated. A favorable acid component contained in the washing liquid may, for example, be lactic acid, sulfuric acid, carbonic acid, citric acid, glycolic acid, malic acid, tartaric acid, gluconic acid, oxalic acid, malonic acid, succinic acid, glutaric acid, adipic acid, maleic acid, fumaric acid, phthalic acid, formic acid, acetic acid, propionic acid, ascorbic acid, nitric acid, hydrochloric acid, boric acid, phosphoric acid or perchloric acid. Preferred is lactic acid, sulfuric acid, acetic acid or glycolic acid with a view to improving the handling efficiency and the charge and discharge efficiency. Such acid components may be used alone or in combination of two or more.

As a method of bringing the lithium-containing composite oxide (I) into contact with the washing liquid, for example, a method of adding the lithium-containing composite oxide (I) to the washing liquid and mixing them with stirring may, for example, be employed. The contact to the washing liquid may be conducted several times.

The temperature of the washing liquid when brought into contact with the lithium-containing composite oxide (I) is preferably from 10 to 90° C. with a view to improving the workability and the charge and discharge efficiency, more preferably from 20 to 60° C. Particularly when the pH of the washing liquid is higher than 4, the temperature is preferably at least 40° C. so as to improve the solubility of lithium.

The time over which the lithium-containing composite oxide (I) is in contact with the washing liquid is not particularly limited, and is preferably at least 0.5 hour whereby a high charge and discharge efficiency and a high discharge capacity will be obtained, more preferably at least 1 hour. The upper limit of the contact time is preferably at most 48 hours in view of the productivity, more preferably at most 24 hours.

In a case where an aqueous acidic solution is used as the washing liquid, the relative amount (X1) of the acid component determined by the following formula (X1) is preferably from 0.005 to 0.20, more preferably from 0.02 to 0.15.

Relative amount (X1) of acid component={amount (mol) of acid component contained in washing liquid/total amount (mol) of transition metal element contained in lithium-containing composite oxide (I)}×{absolute value of valence of acid component}    (X1)

The relative amount (X1) of the acid component is a product of the absolute value of the valence of the acid component and the molar ratio of the amount (unit: mol) of the acid component contained in the washing liquid based on the total amount (unit: mol) of the transition metal element contained in the lithium-containing composite oxide (I). When the relative amount (X1) of the acid component is at least the lower limit of the above range, a high charge and discharge efficiency and a high discharge capacity will be obtained, and when it is at most the upper limit, elution of the transition metal component is small, and the yield tends to be high.

In a washing liquid from which the lithium-containing composite oxide (II) has been removed after washing (hereinafter sometimes referred to as waste liquid), at least lithium is dissolved, and the transition metal contained in the lithium-containing composite oxide (I) may be dissolved. In a case where a method of removing the lithium-containing composite oxide (II) is filtration, the waste liquid may also be called a filtrate.

The lithium elution ratio determined by the following formula (X2) (hereinafter sometimes referred to as "lithium elution ratio (X2)") is preferably from 0.2 to 10%, more preferably from 1 to 6%. When the lithium elution ratio (X2) is within the above range, a high charge and discharge efficiency and a high discharge capacity will be obtained.

Lithium elution ratio (X2)={amount (mol) of Li contained in waste liquid/amount (mol) of Li contained in lithium-containing composite oxide (I)}×100    (X2)

The lithium elution ratio (X2) is a proportion of the amount of Li dissolved in the washing liquid based on the entire Li contained in the lithium-containing composite oxide (I).

The amount of Li contained in the waste liquid and the lithium-containing composite oxide (I) is calculated by measurement by inductively-coupled plasma (ICP) spectrometry.

The transition metal elution ratio determined by the following formula (X3) (hereinafter sometimes referred to as "transition metal elution ratio (X3)") is preferably from 0 to 2%, more preferably from 0 to 1.5%. When the transition metal elution ratio (X3) is within the above range, elution of the transition metal component tends to be small, and the yield tends to be high.

Transition metal elution ratio (X3)={total amount (mol) of transition metal element contained in waste liquid/total amount (mol) of transition metal element contained in lithium-containing composite oxide (I)}×100    (X3)

The transition metal elution ratio (X3) is the proportion of the total amount of the transition metal element dissolved in the washing liquid based on the total amount of the transition metal element contained in the lithium-containing composite oxide (I).

The contents of the transition metal element contained in the waste liquid and in the lithium-containing composite oxide (I) are calculated by measurement by inductively-coupled plasma (ICP) spectrometry.

The pH of the waste liquid at 25° C. is preferably from 4.5 to 12.5, more preferably from 5.5 to 10. Particularly in a case where the elution amount of the transition metal is to be reduced, the pH of the waste liquid at 25° C. is preferably at least 7.

After the lithium-containing composite oxide is in contact with the washing liquid, it is separated from the washing liquid to obtain a lithium-containing composite oxide (II).

As a separation method, conventional solid-liquid separation may be employed, such as filtration, sedimentation or centrifugal separation. In a case where an aqueous acidic solution is used as the washing liquid, the surface of the lithium-containing composite oxide (II) is preferably washed with e.g. water when the composite oxide (II) is separated from the washing liquid.

The lithium-containing composite oxide (II) is preferably dried by heating to remove excess water, absorbed substances, etc. after separated from the washing liquid. By such drying, the lithium-containing composite oxide (II) will be easily handled, and the step (II) and subsequent treatment will efficiently be carried out. The heating temperature is preferably from 40 to 300° C., more preferably from 60 to 200° C. The heating time is not particularly limited, and for example, it is preferably from 0.5 to 30 hours, more preferably from 1 to 20 hours.

When the heating temperature is within the above range, the composite oxide (II) will efficiently be dried.

[Step (II)]

In the step (II) of the present production process, the lithium-containing composite oxide (II) obtained in the step (I) is brought into contact with the composition (1) and the composition (2) to obtain a lithium-containing composite oxide (III).

By using a cathode active material obtainable by such a process, the charge and discharge efficiency and the cycle durability of the resulting lithium ion secondary battery can be improved. The anion (A) contained in the composition (1) withdraws Li from the lithium-containing composite oxide (II) and improves the charge and discharge efficiency of the lithium ion secondary battery. By the presence of the metal element (m) contained in the composition (2) on the surface, elution of the transition metal from the lithium-containing composite oxide can be suppressed, and the cycle durability of the lithium ion secondary battery can be improved.

Particularly when the step (I) is carried out prior to the step (II), a decrease in the effect of withdrawing Li by the anion (A) due to a reaction of the anion (A) contained in the composition (1) with the free alkali, can be prevented.

In the step (II), the order of contact is not limited so long as the lithium-containing composite oxide (II) is simultaneously or continuously brought into contact with the composition (1) and the composition (2). As continuous contact, the lithium-containing composite oxide (II) is brought into contact with the composition (1) and then with the composition (2), it is brought into contact with the composition (2) and then with the composition (1), or it is brought into contact with one composition and then with the other composition alternately several times. As simultaneous contact, the lithium-containing composite oxide (II) is brought into contact with the composition (1) and the composition (2) simultaneously, or it is brought into contact with a mixture of the composition (1) and the composition (2).

Particularly preferably, the lithium-containing composite oxide (II) is brought into contact with the composition (2) and then with the composition (1), whereby the reaction of the cation (M) and the anion (A) is considered to smoothly proceed.

In the step (II), as a method of bringing the lithium-containing composite oxide (II) into contact with the composition (1) and the composition (2), a dipping method, a spray method or a coating method may, for example, be employed, and a spray coating method is preferred. The spray coating method is a method of spraying the composition (1) and the composition (2) to the lithium-containing composite oxide (II), and is preferred since the process is easily carried out and a covering layer can be uniformly formed on the surface of the lithium-containing composite oxide.

The spray coating method is, specifically, preferably carried out by spraying the composition (1) and the composition (2) to particles of the lithium-containing composite oxide (II) with stirring and mixing the compositions with the lithium-containing composite oxide (II). As a stirring apparatus, a low shear force stirring machine such as a drum mixer or a solid air may be used.

In the step (II), the amounts of the composition (1) and the composition (2) to be brought into contact with the lithium-containing composite oxide (II) are preferably such that the lithium-containing composite oxide (II) can be absorbed and attached, whereby no composition (1) nor composition (2) remain after brought into contact with the lithium-containing composite oxide (II), and a step of treating the compositions is not necessary.

In the step (II), the temperature at the time of contact of the lithium-containing composite oxide (II) with the composition (1) and the composition (2) is preferably from 10 to 100° C. The contact time is preferably from 5 minutes to 10 hours.

[Composition (1)]

Composition (1): An aqueous solution containing a monoatomic or polyatomic anion (A) containing at least one element (a) selected from the group consisting of S, P, F and B.

The anion (A) is preferably $SO_4^{2-}$, $SO_3^{2-}$, $S_2O_3^{2-}$, $SO_6^{2-}$, $SO_8^{2-}$, $PO_4^{3-}$, $P_2O_7^{4-}$, $PO_3^{3-}$, $PO_2^{3-}$, $F^-$, $BO_3^{3-}$, $BO_2^-$, $B_4O_7^{2-}$ or $B_5O_8^-$. Among them, in view of the stability and the handling efficiency, more preferred is $SO_4^{2-}$, $PO_4^{3-}$ or $F^-$. Particularly, the anion (A) is more preferably $F^-$, whereby a high discharge capacity will be obtained.

The composition (1) is preferably a solution of a water-soluble compound (1) which contains the element (a) and is dissociated in an aqueous solution to form the anion (A), dissolved in water as a solvent. In this specification, "water soluble" means a solubility (the mass [g] of a solute dissolved in 100 g of a saturated solution) in distilled water at 25° C. of higher than 2, and "hardly soluble" means the solubility of from 0 to 2.

As a preferred example of the water soluble compound (1) having the above solubility of higher than 2 may, for example, be $H_2SO_4$, $H_2SO_3$, $H_2S_2O_3$, $H_2SO_6$, $H_2SO_8$, $H_3PO_4$, $H_4P_2O_7$, $H_3PO_3$, $H_3PO_2$, HF, $H_3BO_3$, $HBO_2$, $H_2B_4O_7$ or $HB_5O_8$, or an ammonium salt, amine salt, lithium salt, sodium salt, potassium salt, thereof. Among them, it is preferred to use a salt rather than an acid in view of the handling efficiency and the safety. Further, an ammonium salt is particularly preferred, which is decomposed at the time of heating and removed. Specifically, $(NH_4)_2SO_4$, $(NH_4)HSO_4$, $(NH_4)_3PO_4$, $(NH_4)_2HPO_4$, $(NH_4)H_2PO_4$, $NH_4F$ or the like is preferred.

The solvent of the composition (1) may contain one or both of a water soluble alcohol and polyol within a range not to impair the solubility of the water soluble compound (1). The water soluble alcohol may be methanol, ethanol, 1-propanol or 2-propanol. The polyol may be ethylene glycol, propylene glycol, diethylene glycol, dipropylene glycol, polyethylene glycol, butanediol or glycerin.

In the composition (1), the total content of the water soluble alcohol and polyol contained in the solvent is preferably from 0 to 20%, more preferably from 0 to 10% based on the total mass of the solvent. In view of the safety, the environment, the handling efficiency and the cost, the solvent is particularly preferably only water.

The composition (1) may contain a pH adjusting agent so as to adjust the solubility of the water soluble compound (1). The pH adjusting agent is preferably one which is volatilized or decomposed when heated in the subsequent step. It is preferably an organic acid such as acetic acid, citric acid, lactic acid, formic acid, maleic acid or oxalic acid, or ammonia. By using such a pH adjusting agent which is volatilized or decomposed, impurities are less likely to remain, whereby favorable battery characteristics tend to be obtained.

The content of the water soluble compound (1) is preferably from 0.5 to 30%, particularly preferably from 2 to 20% as calculated as the anion (A) based on the total mass of the composition (1).

When the content of the water soluble compound (1) is at least 0.5%, the solvent is easily removed by heating in the subsequent step. Further, when it is at most 30%, the viscosity of the composition (1) will be in a proper range, and the lithium-containing composite oxide (II) tends to be uniformly in contact with the composition (1).

The amount of the composition (1) to be brought into contact with the lithium-containing composite oxide (II) is preferably such that the relative amount (Xa) of the anion (A) determined by the following formula (Xa) is within a range of from 0.001 to 0.15. The relative amount (Xa) of the anion (A) is a product of the absolute value of the valence of each anion (A) and the molar ratio of the amount (unit: mol) of the anion (A) contained in the composition (1) based on the total amount (unit: mol) of the transition metal element contained in the lithium-containing composite oxide (I).

When the relative amount (Xa) of the anion (A) is at least 0.001, the charge and discharge efficiency tends to improve, and when it is at most 0.15, a decrease in the capacity due to formation of impurities hardly occurs. The relative amount (Xa) of the anion (A) is more preferably within a range of from 0.003 to 0.12, particularly preferably within a range of from 0.005 to 0.09.

Relative amount (Xa) of anion (A)={amount (mol) of anion (A) contained in composition (1)/total amount (mol) of transition metal element contained in lithium-containing composite oxide (I)}×{absolute value of valence of anion (A)} (Xa)

In a case where the composition (1) contains two or more anions (A1), (A2) . . . , the relative amount (Xa) of the anion (A) is the total amount of all the anions contained in the composition (1). That is, "the relative amount of the anion (A1)", "the relative amount of the anion (A2)" . . . are obtained from the above formula (Xa) with respect to the respective anions, and the sum of the relative amounts is preferably within the above range.

[Composition (2)]

The composition (2) in the present invention is an aqueous solution containing a monoatomic or complex cation (M) of at least one metal element (m) selected from the group consisting of Li, Mg, Ca, Sr, Ba, Y, Ti, Zr, Hf, V, Nb, Ta, Cr, Mo, W, Mn, Fe, Co, Ni, Cu, Zn, Al, Ga, In, Sn, Sb, Bi, La, Ce, Pr, Nd, Gd, Dy, Er and Yb.

In view of the reactivity with the anion (A) of the composition (1), the cation (M) is preferably a monoatomic ion of the metal element (m).

The metal element (m) is preferably Al, Nb or Zr. The cation (M) is preferably $Al^{3+}$, $Nb^{5+}$, $Nb^{3+}$ or $Zr^{4+}$.

Particularly with a view to improving the cycle durability, the metal element (m) is preferably Al, and the cation (M) is more preferably $Al^{3+}$.

The composition (2) is preferably a solution of a water soluble compound (2) which contains the metal element (m) and forms the cation (M) in an aqueous solution, dissolved in water as a solvent.

The water soluble compound (2) may, for example, be an inorganic salt such as a nitrate, a sulfate or a hydrochloride, an organic salt such as an acetate, a citrate, a maleate, a formate, a lactate, a lactate or an oxalate, an organic complex or an amine complex, of the metal element (m). Particularly preferred is a nitrate, an organic acid salt, an organic complex or an amine complex, which is easily decomposed by heat and which is highly soluble in a solvent.

The water soluble compound (2) may, for example, be preferably ammonium zirconium carbonate, halogenated ammonium zirconium, zirconium acetate, zirconium nitrate, aluminum nitrate, aluminum acetate, aluminum oxalate, aluminum citrate, aluminum lactate, basic aluminum lactate, aluminum maleate, niobium nitrate, niobium acetate, niobium citrate, niobium maleate, niobium formate, niobium lactate, niobium oxalate or ammonium niobium oxalate.

The solvent of the composition (2) may contain one or both of the same water soluble alcohol or polyol as for the composition (1) within a range not to impair the solubility of the water soluble compound (2). Further, its content is also the same as for the composition (1). Further, the composition (2) may contain the same pH adjusting agent as for the composition (1) so as to adjust the solubility of the water soluble compound (2).

The content of the water soluble compound (2) is preferably from 0.5 to 30%, particularly preferably from 2 to 20% as calculated as the metal element (m) based on the total mass of the composition (2).

When the content of the water soluble compound (2) is at least 0.5%, the solvent is easily removed by heating in the subsequent step. Further, when it is at most 30%, the viscosity of the composition (2) is within a proper range, and the lithium-containing composite oxide (II) tends to be uniformly in contact with the composition (2).

The amount of the composition (2) to be brought into contact with the lithium-containing composite oxide (II) is preferably such that the relative amount (Xm) of the metal element (m) determined by the following formula (Xm) is within a range of from 0.001 to 0.15. The relative amount (Xm) of the metal element (m) is a product of the absolute value of the valence of each cation (M) and the molar ratio of the amount (unit: mol) of the cation (M) contained in the composition (2) based on the total amount (unit: mol) of the transition metal element contained in the lithium-containing composite oxide (I).

When the relative amount (Xm) of the metal element (m) is at least 0.001, the effect to improve the cycle durability tends to be high, and when it is at most 0.15, a decrease in the capacity by formation of impurities hardly occurs. The relative amount (Xm) of the metal element (m) is more preferably within a range of from 0.003 to 0.12, particularly preferably within a range of from 0.005 to 0.09.

Relative amount (Xm) of metal element (m)={amount (mol) of cation (M) contained in composition (2)/total amount (mol) of transition metal element contained in lithium-containing composite oxide (I)}×{absolute value of valence of cation (M)} (Xm)

In a case where the composition (2) contains two or more metal elements (m1), (m2) . . . , the relative amount (Xm) of the metal element (m) is the total amount of all the metal elements contained in the composition (2). That is, "the relative amount of the metal element (m1)", "the relative amount of the metal element (m2)" . . . are obtained from the above formula (Xm) with respect to the cation (M1) containing the metal element (m1), the cation (M2) containing the metal element (m2) . . . , and the sum of the relative amounts is preferably within the above range.

Further, the amount of the composition (1) and the amount of the composition (2) to be brought into contact with the lithium-containing composite oxide (II) are preferably such that the ratio (Xm/Xa) represented by the relative amount (Xm) of the metal element (m)/the relative amount (Xa) of the anion (A) is from 0.1 to 10. The ratio (Xm/Xa) is more preferably from 0.2 to 5, further preferably from 0.3 to 3. When the ratio (Xm/Xa) is within the above range, a cathode active material which achieves a high discharge capacity and high cycle characteristics tends to be obtained.

[Step (III)]

In the step (III) of the present production process, the lithium-containing composite oxide (III) obtained by the step (II) is heated. By this heating, volatile impurities such as water and organic components contained in the lithium-containing composite oxide (III), the composition (1) and the composition (2) are removed, and a lithium-containing composite oxide having a covering layer on part of the surface is obtained.

In the step (III), before heating, the lithium-containing composite oxide (III) is preferably dried at from 40 to 200° C. for from 0.5 to 8 hours to preliminarily remove most of the water.

The heating in the step (III) is preferably carried out in an oxygen-containing atmosphere. The heating temperature is preferably from 250 to 700° C., more preferably from 350 to 600° C. When the heating temperature is at least 250° C., the covering layer can favorably be formed. Further, since volatile impurities such as remaining water are reduced, a decrease in the cycle retention can be suppressed.

On the other hand, when the heating temperature is at most 700° C., the metal element (m) hardly diffuses in the interior of the cathode active material, and a decrease in the capacity of a battery due to diffusion of the metal element (m) can be prevented.

Further, in a case where a covering layer is amorphous, the heating temperature is preferably from 250° C. to 550° C., more preferably from 350 to 500° C. When the heating temperature is at most 550° C., the covering layer is less likely to be crystallized.

The heating time is preferably from 0.1 to 24 hours, more preferably from 0.5 to 18 hours, particularly preferably from 1 to 12 hours. When the heating time is within the above range, a covering layer will favorably be formed.

The pressure at the time of heating is not particularly limited, and is preferably ordinary pressure or elevated pressure, particularly preferably ordinary pressure.

The covering layer comprises a compound containing the element (a), a compound containing the metal element (m), a compound containing the element (a) and the metal element (m), or a mixture thereof. The covering layer preferably contains at least a hardly soluble compound containing the element (a) and the metal element (m).

The compound containing the element (a) may be a salt of the element (a) and an alkali metal. Such a salt may, for example, be LiF, $Li_3PO_4$, $Li_2SO_4$, NaF or KF.

The compound containing the metal element (m) may, for example, be an oxide or hydroxide of the metal element (m). The oxide may, for example, be $Al_2O_3$ or $ZrO_2$. The hydroxide may, for example, be $Al(OH)_3$ or $Zr(OH)_4$.

The compound containing the element (a) and the metal element (m) may, for example, be specifically $BaSO_4$, $CaSO_4$, $SrSO_4$, $Al_2(SO_4)_3$, $Zr(SO_4)_2$, $CePO_4$, $BiPO_4$, $AlPO_4$, $LaPO_4$, $Ce_3(PO_4)_4$, $Mg_3(PO_4)_2$, $Ba_3(PO_4)_2$, $Ca_3(PO_4)_2$, $Zr_3(PO_4)_2$, $Li_3PO_4$, $Nb_3(PO_4)_5$, LiF, $SrF_2$, $BaF_2$, $CaF_2$, $MgF_2$, $LaF_3$, $AlF_3$, $CeF_3$, $InF_3$, $ZrF_4$ or $NbF_5$. Further, among them, it is preferably $Al_2(SO_4)_3$, $AlPO_4$, $AlF_3$, $Zr(SO_4)_2$ or $ZrF_4$, more preferably $Al_2(SO_4)_3$ or $AlF_3$, particularly preferably $AlF_3$.

<Process for Producing Positive Electrode for Lithium Ion Secondary Battery>

The process for producing a positive electrode for a lithium ion secondary battery of the present invention comprises the above step of producing a cathode active material for a lithium ion secondary battery, and a step of forming a cathode active material layer containing the obtained cathode active material, a binder and an electrically conductive material on a cathode current collector.

The step of forming a cathode active material layer may be carried out by a known means. For example, first, the cathode active material, an electrically conductive material and a binder are dissolved or dispersed in a medium to obtain a slurry, or the cathode active material, an electrically conductive material and a binder are kneaded with a medium to obtain a kneaded product. Then, the obtained slurry or kneaded product is applied to a cathode current collector (positive electrode surface) to form a cathode active material layer.

The electrically conductive material may, for example, be carbon black such as acetylene black, graphite or Ketjen-black. The electrically conductive material may be used alone or in combination of two or more.

The binder may, for example, be a fluorinated resin, a polyolefin, a polymer or copolymer having unsaturated bonds, or an acrylate polymer or copolymer such as an acrylate copolymer or a methacrylate copolymer. The fluorinated resin may, for example, be polyvinylidene fluoride or polytetrafluoroethylene. The polyolefin may, for example, be polyethylene or polypropylene. The polymer or copolymer having unsaturated bonds may, for example, be a polymer or copolymer having unsaturated bonds such as a styrene/butadiene rubber, an isoprene rubber or a butadiene rubber. The cathode current collector may be an aluminum foil or an aluminum alloy foil.

<Process for Producing Lithium Ion Secondary Battery>

The process for producing a lithium ion secondary battery of the present invention comprises the above step for producing a positive electrode for a lithium ion secondary battery, and a step of assembling a lithium ion secondary battery by using the positive electrode for a lithium ion secondary battery, a negative electrode, a non-aqueous electrolyte and a separator.

The step of assembling a lithium ion secondary battery may be carried out by a known means.

[Negative Electrode]

The negative electrode is obtained by forming an anode active material layer containing an anode active material on an anode current collector. It may be formed, for example, by kneading an anode active material with an organic solvent to prepare a slurry and applying the prepared slurry to an anode current collector, followed by drying and pressing.

The anode current collector may, for example, be a nickel foil or a copper foil.

The anode active material is not limited so long as it is a material capable of absorbing and desorbing lithium ions at a relatively low potential, and may, for example, be a lithium metal, a lithium alloy, a carbon material, an oxide composed mainly of a metal in group 14 or 15 of the periodic table, a carbon compound, a silicon carbide compound, a silicon oxide compound, titanium sulfate or a boron carbide compound.

The carbon material to be used as the anode active material may, for example, be non-graphitized carbon, artificial graphite, natural graphite, thermally decomposed carbon, cokes, graphites, glassy carbons, an organic polymer compound fired product, carbon fibers, activated carbon or carbon black. The cokes may, for example, be pitch coke, needle coke or petroleum coke. The organic polymer compound fired product may be a product obtained by firing and carbonizing a phenol resin, a furan resin or the like at an appropriate temperature.

The metal in group 14 of the periodic table may, for example, be Si or Sn. Among them, the metal in group 14 of the periodic table is preferably Si.

The non-aqueous electrolyte may, for example, be a non-aqueous electrolytic solution having an electrolyte salt dissolved in an organic solvent, an inorganic solid electrolyte, or a solid or a gelled polymer electrolyte in which an electrolyte salt is mixed with or dissolved in e.g. a polymer compound.

The organic solvent may be an organic solvent known for a non-aqueous electrolytic solution. It may, for example, be propylene carbonate, ethylene carbonate, diethyl carbonate, dimethyl carbonate, 1,2-dimethoxyethane, 1,2-diethoxyethane, γ-butylolactone, diethyl ether, sulfolane, methylsulfolane, acetonitrile, an acetic acid ester, a butyric acid ester or a propionic acid ester. Among them, in view of the voltage stability, the organic solvent is preferably a cyclic carbonate such as propylene carbonate or a chain carbonate such as dimethyl carbonate or diethyl carbonate. The organic solvent may be used alone or in combination of two or more.

The inorganic solid electrolyte may, for example, be lithium nitride or lithium iodide.

The polymer compound to be used for the solid polymer electrolyte in which an electrolyte salt is mixed with or dissolved in the polymer compound, may, for example, be polyethylene oxide, polypropylene oxide, polyphosphazene, polyaziridine, polyethylene sulfide, polyvinyl alcohol, polyvinylidene fluoride, polyhexafluoropropylene or a derivative, mixture or composite thereof.

The polymer compound to be used for the gelled polymer electrolyte in which an electrolyte salt is mixed with or dissolved in the polymer compound may, for example, be a fluorinated polymer compound, polyacrylonitrile, a copolymer of polyacrylonitrile, polyethylene oxide or a copolymer of polyethylene oxide. The fluorinated polymer compound may, for example, be poly(vinylidene fluoride) or poly (vinylidene fluoride-co-hexafluoropropylene).

As a matrix of the gelled electrolyte, preferred is a fluorinated polymer compound from the viewpoint of the stability in the oxidation/reduction reaction.

The electrolyte salt may be any known salt to be used for a lithium ion secondary battery and may, for example, be LiClO4, $LiPF_6$, $LiBF_4$ or $CF_3SO_3Li$.

The separator may, for example, be a microporous polyolefin film represented by polyethylene or polypropylene, a film made of a copolymer of polyvinylidene fluoride and hexafluoropropylene, or a composite film having inorganic particles, an aramid resin, a fluorinated resin or the like applied to the surface of a microporous polyolefin film.

The shape of the lithium ion secondary battery is not particularly limited and may, for example, be a coin-shape, a sheet-form (film-form), a folded shape, a wound cylinder with bottom, or a button shape, and is suitably selected depending upon the intended use.

EXAMPLES

Now, the present invention will be described in further detail with reference to Examples. However, it should be understood that the present invention is by no means restricted to the following specific Examples. Ex. 1 to 4 and 13 to 20 are Examples of the present invention, and Ex. 5 to 12 are Comparative Examples.

(Preparation of Lithium-Containing Composite Oxide)

In this Example, a lithium-containing composite oxide was prepared by a carbonate coprecipitation method.

1152 g of water was added to a mixture of 122 g of nickel(II) sulfate hexahydrate, 130 g of cobalt(II) sulfate heptahydrate and 446 g of manganese(II) sulfate pentahydrate, to prepare a material solution which is an aqueous metal salt solution in which the compounds were uniformly dissolved. Further, by adding 401 g of distilled water, 99 g of ammonium sulfate was uniformly dissolved to obtain an aqueous ammonium sulfate solution. By adding 1900 g of distilled water, 1 g of sodium carbonate was uniformly dissolved to obtain a mother liquid. Further, by adding 1850 g of distilled water, 350 g of sodium carbonate was uniformly dissolved to obtain an aqueous carbonate solution.

Then, into a 2 L baffle-equipped glass reactor, the mother liquid was put and heated to 50° C. by a mantle heater, and the material solution and the ammonium sulfate solution were added at rates of 5.0 g/min and 0.5 g/min respectively, over a period of 6 hours while the solution in the reactor was stirred by a two-stage tilt paddle type stirring blade to obtain a coprecipitate containing Ni, Co and Mn.

During addition of the material solution, the aqueous carbonate solution was added to maintain the pH in the reactor to be 8.0. Further, in order to prevent oxidation of the precipitated transition metal carbonate, nitrogen gas was introduced into the reactor at a rate of 0.5 L/min.

The obtained coprecipitate was washed by repetition of pressure filter and dispersion in distilled water to remove impurity ions. The washing was terminated when the electrical conductivity of the filtrate became less than 100 µS/cm, followed by drying at 120° C. for 15 hours.

The total content of the transition metal contained in the coprecipitate after washed and dried was obtained by back titration with ZINCON reagent, EDTA and an aqueous zinc chloride solution, whereupon it was 8.36 mol/kg.

Then, 300 g of this coprecipitate and 139.5 g of lithium carbonate having a lithium content of 26.96 mol/kg were mixed and fired in an oxygen-containing atmosphere at 880° C. for 16 hours to obtain a powder of a lithium-containing composite oxide (I).

The amounts of Li, Ni, Co and Mn contained in the lithium-containing composite oxide (I) were measured by ICP. The molar ratio of Li:Ni:Co:Mn was 1.5:0.16:0.17:0.67. The composition of the lithium-containing composite oxide (I) is represented as $Li(Li_{0.20}Ni_{0.128}Co_{0.136}Mn_{0.536})O_2$. Further, the average particle size D50 of the lithium-containing composite oxide (I) was 10.8 µm.

With respect to the lithium-containing composite oxide (I), XRD measurement using CuKα ray as an X-ray source was carried out. From the XRD measurement, the lithium-containing composite oxide (A) was confirmed to have a layered rock salt crystal structure (space group R-3m), and a peak of layered $Li_2MnO_3$ was observed in a range of 2θ=20 to 25°.

For the XRD measurement, RINT-TTR-III, tradename, manufactured by Rigaku Corporation was used. The XRD measurement conditions were such that the voltage was 50 kV, the tube current was 300 mA, the measurement range θ=10 to 90° with a scan axis 2θ/θ, the sampling width was 0.04° and the scanning speed was 1°/min.

Ex. 1

Step (I)

In a 1,000 mL plastic container, 20 g of lactic acid (purity: 90%) and 800 g of distilled water were mixed to prepare a washing liquid. The pH of the washing liquid was 2.3. Further, 200 g of the lithium-containing composite oxide (I) was added to the washing liquid, followed by stirring by a stirring blade for 3 minutes. Then, the stirring blade was taken out, the plastic container was covered, and the content was mixed by a roller mixer at a number of revolutions of 20 rpm for 24 hours. Mixing was conducted at room temperature (25° C.).

The relative amount (X1) of the acid component calculated by the formula (X1) was 0.11.

Then, the mixture was subjected to filtration and dried at 80° C. for 15 hours to obtain a lithium-containing composite oxide (II) subjected to washing treatment. The pH of the filtrate was 6.3. The contents of lithium and the transition metal (total content of Ni, Co and Mn) contained in the filtrate were measured by ICP.

The lithium elution ratio (X2) calculated by the above formula (X2) was 3.7%, and the transition metal elution ratio (X3) obtained by the above formula (X3) was 0.7%.

Step (II)

5.8 g of distilled water was added to 4.2 g of an aqueous basic aluminum lactate solution having an Al content of 8.8% as calculated as $Al_2O_3$ based on the mass of the aqueous solution, followed by mixing to prepare an aqueous aluminum lactate solution (composition (2)). The content (concentration as calculated as Al) of the metal element (m) based on the mass of the aqueous aluminum lactate solution (composition (2)) was 3.7%.

8.38 g of distilled water was added to 1.62 g of ammonium fluoride ($NH_4F$), followed by mixing to prepare an aqueous ammonium fluoride solution (composition (1)). The concentration as calculated as the anion (A) based on the mass of the aqueous ammonium fluoride solution (composition (1)) (the concentration as calculated as $F^-$) was 8.3%.

While 8 g of the lithium-containing composite oxide (II) obtained in the step (I) was stirred, 0.64 g of the aqueous aluminum lactate solution (composition (2)) was sprayed by a spray coating method to bring the lithium-containing composite oxide (II) and the aqueous aluminum lactate solution into contact with each other with mixing. Then, 0.64 g of the aqueous ammonium fluoride solution (composition (1)) was sprayed by a spray coating method to bring the lithium-containing composite oxide (II), the aqueous aluminum lactate solution and the aqueous ammonium fluoride solution into contact with one another with mixing to obtain a lithium-containing composite oxide (III). Such contacts were carried out at 25° C. By such contacts, the entire composition (1) and composition (2) were attached to and adsorbed on the lithium-containing composite oxide (II).

In this step, the amount of the composition (1) brought into contact with the lithium-containing composite oxide (II) was such that the relative amount (Xa) of the anion (A) determined by the above formula (Xa) would be 0.038.

Further, the amount of the composition (2) brought into contact with the lithium-containing composite oxide (II) was such that the relative amount (Xm) of the metal element (m) determined by the above formula (Xm) would be 0.019. The valence of the metal element Al used in this Example is +3.

Step (III)

The obtained lithium-containing composite oxide (III) was dried at 80° C. for 4 hours and then heated in an oxygen-containing atmosphere at 450° C. for 5 hours to obtain a cathode active material consisting of lithium-containing composite oxide particles having a covering layer containing Al and F on a part of their surface.

Ex. 2

A cathode active material consisting of lithium-containing composite oxide particles having a covering layer containing Al and F on a part of their surface was obtained in the same manner as in Ex. 1 except that the amount of the aqueous ammonium fluoride solution sprayed was 0.32 g, and the relative amount (Xa) of the anion (A) was 0.019.

Ex. 3

A cathode active material consisting of lithium-containing composite oxide particles having a covering layer containing Al and F on a part of their surface was obtained in the same manner as in Ex. 1 except that the amount of the aqueous ammonium fluoride solution sprayed was 1.28 g, and the relative amount (Xa) of the anion (A) was 0.057.

Ex. 4

The step (I) was carried out in the same manner as in Ex. 1.

3.26 g of distilled water was added to 1.75 g of an aqueous ammonium zirconium carbonate having a Zr content of 20.7% as calculated as $ZrO_2$ based on the mass of the aqueous solution, followed by mixing to prepare ammonium zirconium carbonate (composition (2)). The content (concentration as calculated as Zr) of the metal element (m) based on the mass of the aqueous ammonium zirconium carbonate solution (composition (2)) was 7.2%.

While 8 g of the lithium-containing composite oxide (II) obtained in the step (I) was stirred, 0.64 g of the aqueous ammonium zirconium carbonate (composition (2)) was sprayed by a spray coating method to bring the lithium-containing composite oxide (II) and the aqueous ammonium zirconium carbonate solution into contact with each other with mixing. Then, 0.64 g of the aqueous ammonium fluoride solution (composition (1)) was sprayed by a spray coating method to bring the lithium-containing composite oxide (II), ammonium zirconium carbonate and the aqueous ammonium fluoride solution into contact with one another with mixing to obtain a lithium-containing composite oxide (III). Such contacts were carried out at 25° C. By such contacts, the entire composition (1) and composition (2) were attached to and adsorbed on the lithium-containing composite oxide (II).

In this step, the amount of the composition (1) brought into contact with the lithium-containing composite oxide (II) was such that the relative amount (Xa) of the anion (A) determined by the formula (Xa) would be 0.038.

Further, the amount of the composition (2) brought into contact with the lithium-containing composite oxide (II) was such that the relative amount (Xm) of the metal element (m) determined by the above formula (Xm) would be 0.025. The valence of the metal element Zr used in this example is +4.

The step (III) was carried out in the same manner as in Ex. 1 to obtain a cathode active material consisting of lithium-containing composite oxide particles having a covering layer containing Zr and F on a part of their surface.

Ex. 5

The lithium-containing composite oxide (II) subjected to a washing treatment in the same manner as in the step (I) in Ex. 1 was used as a cathode active material.

The steps (II) and (III) were not carried out.

Ex. 6

A cathode active material consisting of lithium-containing composite oxide particles having a covering layer containing Al on a part of their surface was obtained in the same manner as in Ex. 1 except that in the step (II), spray coating of the aqueous ammonium fluoride solution (composition (1)) was not carried out.

Ex. 7

A cathode active material consisting of lithium-containing composite oxide particles having a covering layer containing Al on a part of their surface was obtained in the same manner as in Ex. 1 except that the amount of the aqueous aluminum lactate solution sprayed was 1.28 g, and the relative amount (Xm) of the metal element (m) was 0.038, and that in the step (II), spray coating of the aqueous ammonium fluoride solution (composition (1)) was not carried out.

Ex. 8

A cathode active material consisting of lithium-containing composite oxide particles having a covering layer containing Al and F on a part of their surface was obtained in the same manner as in Ex. 1 except that the step (I) was not carried out, and in the step (II), the lithium-containing composite oxide (I) was used.

Ex. 9

A cathode active material consisting of lithium-containing composite oxide particles having a covering layer containing Al on a part of their surface was obtained in the same manner as in Ex. 6 except that the step (I) was not carried out, and in the step (II), the lithium-containing composite oxide (I) was used.

Ex. 10

A cathode active material consisting of lithium-containing composite oxide particles having a covering layer containing F on a part of their surface was obtained in the same manner as in Ex. 1 except that in the step (II), spray coating of the aqueous aluminum lactate solution (composition (2)) was not carried out.

Ex. 11

A cathode active material consisting of lithium-containing composite oxide particles having a covering layer containing F on a part of their surface was obtained in the same manner as in Ex. 3 except that in the step (II), spray coating of the aqueous aluminum lactate solution (composition (2)) was not carried out.

Ex. 12

A cathode active material consisting of lithium-containing composite oxide particles having a covering layer containing Zr and F on a part of their surface was obtained in the same manner as in Ex. 4 except that the step (I) was not carried out.

Ex. 13

In the step (I) in Ex. 1, in a 50 mL screw tube bottle, 0.5 g of lactic acid (purity: 90%) and 40 g of distilled water were put and mixed to obtain a washing liquid. The pH of the washing liquid was 2.4. Further, 10 g of the lithium-containing composite oxide (A) was added, followed by stirring by a stirrer for 3 minutes. Then, the stirrer chip was taken out, the plastic container was covered, and the content was mixed by a roller mixer at a number of revolutions of 20 rpm for 24 hours. Mixing was carried out at room temperature (25° C.).

The relative amount (X1) of the acid component calculated from the above formula (X1) was 0.05.

Then, the mixture was subjected to filtration and dried at 80° C. for 15 hours to obtain a lithium-containing composite oxide (II). The pH of the filtrate was 7.3. The contents of lithium and the transition metal (the total content of Ni, Co and Mn) contained in the filtrate were measured by ICP.

The lithium elution ratio (X2) determined by the above formula (X2) was 2.0%, and the transition metal elution ratio (X3) determined by the above formula (X3) was 0.1%.

The steps (II) and (III) were carried out in the same manner as in Ex. 1 to obtain a cathode active material consisting of lithium-containing composite oxide particles having a covering layer containing Al and F on a part of their surface.

Ex. 14 to 18

In Ex. 13, the washing liquid in the step (I) was changed as identified in Table 2. Except for this change, the steps (II) and (III) were carried out in the same manner as in Ex. 1 to obtain a cathode active material consisting of lithium-containing composite oxide particles having a covering layer containing Al and F on a part of their surface.

Further, in Ex. 14, a mixture of 1.5 g of lactic acid (purity: 90%) and 40 g of distilled water was used as the washing liquid. In Ex. 15, a mixture of 0.3 g of sulfuric acid (purity: 95%) and 40 g of distilled water was used as the washing liquid. In Ex. 16, a mixture of 0.6 g of sulfuric acid (purity: 95%) and 40 g of distilled water was used as the washing liquid. In Ex. 17, a mixture of 0.6 g of acetic acid and 40 g of distilled water was used as the washing liquid. In Ex. 18, a mixture of 0.9 g of acetic acid and 40 g of distilled water was used as the washing liquid.

Ex. 19

In the step (I) in Ex. 1, 1 g of lactic acid (purity: 90%) and 35 g of distilled water were put and mixed in a 50 mL screw tube bottle to obtain a washing liquid. The pH of the washing liquid was 2.3. Further, 20 g of the lithium-containing composite oxide (I) was added, followed by stirring by a stirrer for 3 minutes. Then, the stirrer chip was taken out, the plastic container was covered, and the content was mixed by a roller mixer at a number of revolutions of 20 rpm for 24 hours. Mixing was carried out at room temperature (25° C.).

The relative amount (X1) of the acid component calculated from the above formula (X1) was 0.05.

Then, the mixture was subjected to filtration and dried at 80° C. for 15 hours to obtain a lithium-containing composite oxide (II). The pH of the filtrate was 7.4. The contents of lithium and the transition metal (the total content of Ni, Co and Mn) contained in the filtrate were measured by ICP.

The lithium elution ratio (X2) determined by the above formula (X2) was 1.9%, and the transition metal elution ratio (X3) determined by the above formula (X3) was 0.1%.

The steps (II) and (III) were carried out in the same manner as in Ex. 1 to obtain a cathode active material consisting of lithium-containing composite oxide particles having a covering layer containing Al and F on a part of their surface.

Ex. 20

In the step (I) in Ex. 1, 40 g of distilled water was used as the washing liquid. The pH of the washing liquid was 6.7. The washing liquid was adjusted to be 80° C., 10 g of the lithium-containing composite oxide (A) was added, and the mixture was left at rest for 15 hours while the liquid temperature was maintained at 80° C.

Then, the mixture was subjected to filtration and dried at 80° C. for 15 hours to obtain a lithium-containing composite oxide (II). The pH of the filtrate was 12.3. The contents of lithium and the transition metal (the total content of Ni, Co and Mn) contained in the filtrate were measured by ICP.

The lithium elution ratio (X2) determined by the above formula (X2) was 0.2. Since the content of the transition metal was less than 0.05, it was rounded off to one decimal place to 0.0.

The steps (II) and (III) were carried out in the same manner as in Ex. 1 to obtain a cathode active material consisting of lithium-containing composite oxide particles having a covering layer containing Al and F on a part of their surface.

The conditions in Ex. 1 to 12 are shown in Table 1, and the conditions in Ex. 1 to 7 and 13 to 20 are shown in Table 2.

TABLE 1

|  | Washing | Metal element (m) | Relative amount (Xm) of metal element (m) | Anion (A) | Relative amount (Xa) of anion (A) |
|---|---|---|---|---|---|
| Ex. 1 | Conducted | Al | 0.019 | F⁻ | 0.038 |
| Ex. 2 | Conducted | Al | 0.019 | F⁻ | 0.019 |
| Ex. 3 | Conducted | Al | 0.019 | F⁻ | 0.057 |
| Ex. 4 | Conducted | Zr | 0.025 | F⁻ | 0.038 |
| Ex. 5 | Conducted | Nil | 0 | Nil | 0 |
| Ex. 6 | Conducted | Al | 0.019 | Nil | 0 |
| Ex. 7 | Conducted | Al | 0.038 | Nil | 0 |
| Ex. 8 | Nil | Al | 0.019 | F⁻ | 0.038 |
| Ex. 9 | Nil | Al | 0.019 | Nil | 0 |
| Ex. 10 | Conducted | Nil | 0 | F⁻ | 0.038 |
| Ex. 11 | Conducted | Nil | 0 | F⁻ | 0.057 |
| Ex. 12 | Nil | Zr | 0.025 | F⁻ | 0.038 |

TABLE 2

|  | Washing liquid | Relative amount (X1) of acid component | Washing liquid pH | Filtrate pH | Lithium elution ratio (X2) [%] | Transition metal elution ratio (X3) [%] |
|---|---|---|---|---|---|---|
| Ex. 1 to 4 | Aqueous lactic acid solution | 0.11 | 2.3 | 6.3 | 3.7 | 0.7 |
| Ex. 5 to 7 |  |  |  |  |  |  |
| Ex. 13 | Aqueous lactic acid solution | 0.05 | 2.4 | 7.3 | 2 | 0.1 |
| Ex. 14 | Aqueous lactic acid solution | 0.16 | 2.2 | 5.5 | 5 | 1.5 |
| Ex. 15 | Aqueous sulfuric acid solution | 0.06 | 1.1 | 7 | 3.2 | 0.1 |
| Ex. 16 | Aqueous sulfuric acid solution | 0.13 | 0.8 | 5.3 | 5.9 | 0.7 |
| Ex. 17 | Aqueous acetic acid solution | 0.11 | 2.5 | 4.9 | 3 | 0.3 |
| Ex. 18 | Aqueous acetic acid solution | 0.16 | 2.5 | 4.6 | 3.4 | 0.4 |
| Ex. 19 | Aqueous lactic acid solution (solid content increased) | 0.05 | 2.3 | 7.4 | 1.9 | 0.1 |
| Ex. 20 | Distilled water (80° C.) | 0 | 6.7 | 12.3 | 0.2 | 0 |

[Production of Cathode Sheet]

The cathode active material obtained in Ex. 1 to 20, acetylene black as an electrically conductive material and a solution (solvent: N-methylpyrrolidone) containing 12.0 mass % of polyvinylidene fluoride (binder) were mixed, and further N-methylpyrrolidone was added to prepare a slurry. On that occasion, the mass ratio of the cathode active material, acetylene black and polyvinylidene fluoride was 80:10:10.

Then, the slurry was applied to one side of an aluminum foil (cathode current collector) having a thickness of 20 μm by means of a doctor blade, and dried at 120° C., followed by roll pressing twice to prepare a cathode sheet.

As Reference Example 1, using the lithium-containing composite oxide (I) as the cathode active material, a cathode sheet was prepared in the same manner as above.

[Production of Lithium Ion Secondary Battery]

Using the above obtained cathode sheet as a positive electrode, a stainless steel simplified sealed cell type lithium ion secondary battery was assembled in an argon globe box.

A metal lithium foil having a thickness of 500 μm was used as a negative electrode, a stainless steel plate having a thickness of 1 mm was used as an anode current collector, and a porous polypropylene having a thickness of 25 μm was used as a separator. Further, a LiPF6 solution at a concentration of 1 mol/dm³ was used as the electrolytic solution. As the solvent of the electrolytic solution, a mixed solution of EC (ethylene carbonate) and DEC (diethyl carbonate) in a volume ratio of 1:1 was used.

[Evaluation of Lithium Ion Secondary Battery]

With respect to the above produced lithium ion secondary battery, the following evaluations were carried out. The evaluation results are shown in Table 3.

(Initial Efficiency)

The lithium ion secondary battery was charged to 4.6 V at a load current of 20 mA per 1 g of the cathode active material and then discharged to 2.0 V at a load current of 20 mA per 1 g of the cathode active material. The charge capacity, the discharge capacity and the charge and discharge efficiency at that time were taken as the initial charge capacity, the initial discharge capacity and the initial efficiency, respectively.

(Cycle Durability)

Then, a charge and discharge cycle of charging the lithium ion secondary battery to 4.6 V at a load current of 200 mA per 1 g of the cathode active material and discharging it to 2.0 V at high rate at a load current of 200 mA per 1 g of the cathode active material, was repeated 50 times. On that occasion, the discharge capacity at the second cycle was taken as the cycle initial capacity, and a value obtained by dividing the discharge capacity at the 50th cycle by the cycle initial capacity was calculated and taken as the cycle retention.

TABLE 3

|  | Initial charge capacity [mAh/g] | Initial discharge capacity [mAh/g] | Initial efficiency [%] | Cycle initial capacity [mAh/g] | Cycle retention [%] |
|---|---|---|---|---|---|
| Ex. 1 | 319 | 282 | 88.30 | 203 | 97.20 |
| Ex. 2 | 325 | 280 | 86.00 | 203 | 94.70 |
| Ex. 3 | 319 | 294 | 89.10 | 204 | 97.40 |
| Ex. 4 | 320 | 284 | 88.50 | 203 | 96.00 |
| Ex. 5 | 329 | 283 | 86.10 | 205 | 90.50 |
| Ex. 6 | 330 | 280 | 84.90 | 204 | 91.90 |
| Ex. 7 | 325 | 273 | 84.10 | 197 | 92.20 |
| Ex. 8 | 333 | 274 | 82.30 | 198 | 93.20 |
| Ex. 9 | 335 | 256 | 76.50 | 171 | 93.20 |
| Ex. 10 | 319 | 283 | 88.50 | 203 | 91.50 |
| Ex. 11 | 316 | 278 | 88.00 | 198 | 91.10 |
| Ex. 12 | 327 | 269 | 82.20 | 189 | 92.50 |
| Ex. 13 | 323 | 279 | 86.50 | 202 | 94.10 |
| Ex. 14 | 319 | 281 | 88.10 | 205 | 97.20 |
| Ex. 15 | 316 | 278 | 88.10 | 200 | 96.90 |
| Ex. 16 | 307 | 279 | 90.80 | 202 | 98.80 |
| Ex. 17 | 322 | 279 | 86.70 | 200 | 94.70 |
| Ex. 18 | 319 | 278 | 87.20 | 202 | 95.90 |
| Ex. 19 | 323 | 278 | 85.90 | 200 | 94.00 |

TABLE 3-continued

| | Initial charge capacity [mAh/g] | Initial discharge capacity [mAh/g] | Initial efficiency [%] | Cycle initial capacity [mAh/g] | Cycle retention [%] |
|---|---|---|---|---|---|
| Ex. 20 | 325 | 273 | 85.10 | 203 | 94.50 |
| Ref. Ex. 1 | 339 | 257 | 75.80 | 169 | 90.40 |

As evident from the results in Table 3, in Ex. 1 to 4 and 13 to 20 in which contact with the washing liquid (step (I)) and the coating (steps (II) and (III)) were carried out, and the composition (1) and the composition (2) were used as the coating liquid, excellent initial efficiency and cycle retention are obtained as compared with Reference Example 1 in which neither contact with the washing liquid nor coating was carried out.

The effect obtained by the present invention is a synergistic effect which is more excellent than mere addition of the effect only by contact with the washing liquid and the effect only by coating, and is an unexpected effect.

That is, in Ex. 5 in which only the contact with the washing liquid was carried out, the initial efficiency was improved as compared with Reference Example 1, however, the cycle retention was at the same level. It is estimated from the results that only the initial efficiency improves by a step of bringing the composite oxide into contact with the washing liquid.

However, in Ex. 1 in which contact with the washing liquid and coating were carried out, not only the initial efficiency but also the cycle retention improved as compared with Ex. 8 in which only coating was carried out.

Whereas in Ex. 9 in which contact with the washing liquid was not carried out, and coating was carried out using only the composition (2), the cycle retention improved as compared with Reference Example 1, however, the initial efficiency was at the same level. It is estimated from such results that the cycle retention improves while the initial efficiency is maintained, by adding a coating step using only the composition (2).

However, in Ex. 6 in which after contact with the washing liquid, a coating step using only the composition (2) was carried out, the cycle retention improved as compared with Ex. 5, however, the initial efficiency decreased.

Further, the following are found from the results in Table 3.

By comparison between Ex. 1 and 3 in which the compositions (1) and (2) were used as the coating liquid and Ex. 10 and 11 in which only the composition (1) was used as the coating liquid, the cycle retention remarkably improved in Ex. 1 and 3.

By comparison between Ex. 1 and Ex. 4 in which the compositions (1) and (2) were used as the coating liquid, the cycle retention is high in Ex. 1 in which the metal element (m) contained in the composition (2) is Al than in Ex. 4 in which the metal element (m) is Zr.

By comparison among Ex. 1, 13 to 20 in which the conditions of the washing liquid were changed, in Ex. 1 and 13 to 19 in which the pH of the washing liquid is at most 5, the lithium elution ratio is high and an excellent initial efficiency was obtained as compared with Ex. 20. Whereas in Ex. 13, 15, 19 and 20 in which the pH of the filtrate is at least 7, the transition metal elution ratio is low as compared with Ex. 1, 14, 16, 17 and 18.

INDUSTRIAL APPLICABILITY

The present invention is suitably applicable to production of a cathode active material for a lithium ion secondary battery which can improve both initial efficiency and cycle retention, a positive electrode for a lithium ion secondary battery and a lithium ion secondary battery.

This application is a continuation of PCT Application No. PCT/JP2014/067020, filed on Jun. 26, 2014, which is based upon and claims the benefit of priority from Japanese Patent Application No. 2013-142029 filed on Jul. 5, 2013. The contents of those applications are incorporated herein by reference in their entireties.

What is claimed is:

1. A process for producing a cathode active material for a lithium ion secondary battery, comprising the following steps (I), (II) and (III) in this order:
    step (I): a step of bringing a lithium-containing composite oxide (I) containing Li element and a transition metal element into contact with a washing liquid and then separating it from the washing liquid to obtain a lithium-containing composite oxide (II),
    step (II): a step of bringing the lithium-containing composite oxide (II) into contact with the following composition (1) and composition (2) to obtain a lithium-containing composite oxide (III), and
    step (III): a step of heating the lithium-containing composite oxide (III),
    composition (1): an aqueous solution containing a monoatomic or polyatomic anion (A) containing at least one element (a) selected from the group consisting of S, P, F and B,
    composition (2): an aqueous solution containing a monoatomic or complex cation (M) of at least one metal element (m) selected from the group consisting of Li, Mg, Ca, Sr, Ba, Y, Ti, Zr, Hf, V, Nb, Ta, Cr, Mo, W, Mn, Fe, Co, Ni, Cu, Zn, Al, Ga, In, Sn, Sb, Bi, La, Ce, Pr, Nd, Gd, Dy, Er and Yb.

2. The process for producing a cathode active material for a lithium ion secondary battery according to claim 1, wherein the metal element (m) contained in the composition (2) is Al.

3. The process for producing a cathode active material for a lithium ion secondary battery according to claim 1, wherein in the step (II), the lithium-containing composite oxide (II) is brought into contact with the compositions (1) and (2) so that the sum of the products of the absolute value of the valence of each cation (M) and the molar ratio of the cation (M) contained in the composition (2) based on the total amount of the transition metal element contained in the lithium-containing composite oxide (I), is within a range of from 0.001 to 0.15.

4. The process for producing a cathode active material for a lithium ion secondary battery according to claim 1, wherein the anion (A) contained in the composition (1) is $F^-$.

5. The process for producing a cathode active material for a lithium ion secondary battery according to claim 1, wherein in the step (II), the lithium-containing composite oxide (II) is brought into contact with the compositions (1) and (2) so that the sum of the products of the absolute value of the valence of each anion (A) and the molar ratio of the anion (A) contained in the composition (1) based on the total amount of the transition metal element contained in the lithium-containing composite oxide (I), is within a range of from 0.001 to 0.15.

6. The process for producing a cathode active material for a lithium ion secondary battery according to claim 1, wherein in the step (I), the washing liquid is an aqueous acidic solution having a pH of from 0 to 6 at 25° C.

7. The process for producing a cathode active material for a lithium ion secondary battery according to claim 1, wherein the lithium elution ratio is from 0.2 to 10% as represented by the proportion of the amount of lithium element dissolved in the washing liquid based on the entire lithium element contained in the lithium-containing composite oxide (I).

8. The process for producing a cathode active material for a lithium ion secondary battery according to claim 1, wherein the lithium-containing composite oxide (I) contains Li element and at least one transition metal element selected from the group consisting of Ni, Co and Mn, and the molar amount of the Li element is more than 1.2 times the total molar amount of the transition metal element.

9. The process for producing a cathode active material for a lithium ion secondary battery according to claim 8, wherein the lithium-containing composite oxide (I) is a compound represented by the following formula (1):

$$Li(Li_{x1}Mn_{y1}Me_{z1})Me'_aO_pF_q \quad (1)$$

wherein Me is at least one element selected from the group consisting of Co and Ni, Me' is at least one member selected from the group consisting of Al, Cr, Mg, Mo, Ru, Ti, Zr and Fe, $0.1<x^1<0.25$, $0.5 \leq y^1/(y^1+z^1) \leq 0.8$, $0 \leq a \leq 0.1$, $x^1+y^1+z^1=1$, $1.9<p<2.1$ and $0 \leq q \leq 0.1$.

10. The process for producing a cathode active material for a lithium ion secondary battery according to claim 1, wherein the heating in the step (III) is carried out at from 250 to 700° C.

11. The process for producing a cathode active material for a lithium ion secondary according to claim 1, wherein the solvent of each of the compositions (1) and (2) in the step (II) is only water.

12. The process for producing a cathode active material for a lithium ion secondary battery according to claim 1, wherein in the step (II), the lithium-containing composite oxide (II) is brought into contact with the composition (1) and the composition (2) by spraying the composition (1) and the composition (2) to the lithium-containing composite oxide (II) by a spray coating method.

13. The process for producing a cathode active material for a lithium ion secondary battery according to claim 12, wherein in the step (II), the lithium-containing composite oxide (II) is brought into contact with the composition (1) and the composition (2) by spraying the composition (1) and the composition (2) to the lithium-containing composite oxide (II) with stirring.

14. A process for producing a positive electrode for a lithium ion secondary battery, which comprises a step of producing a cathode active material for a lithium ion secondary battery by the production process as defined in claim 1, and
a step of forming a cathode active material layer containing the cathode active material for a lithium ion secondary battery, a binder and an electrically conductive material on a cathode current collector.

15. A process for producing a lithium ion secondary battery, which comprises a step of producing a positive electrode for a lithium ion secondary battery by the production process as defined in claim 14, and
a step of assembling a lithium ion secondary battery by using the positive electrode for a lithium ion secondary battery, a negative electrode, a non-aqueous electrolyte and a separator.

\* \* \* \* \*